(12) United States Patent
Carlson et al.

(10) Patent No.: US 7,136,848 B2
(45) Date of Patent: Nov. 14, 2006

(54) APPARATUS AND METHOD FOR REFRESHING A DATABASE QUERY

(75) Inventors: David Glenn Carlson, Rochester, MN (US); Kevin James Kathmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 10/230,641

(22) Filed: Aug. 29, 2002

(65) Prior Publication Data

US 2003/0229621 A1    Dec. 11, 2003

Related U.S. Application Data

(63) Continuation-in-part of application No. 10/165,293, filed on Jun. 7, 2002, now Pat. No. 6,915,291.

(51) Int. Cl.
*G06F 17/30* (2006.01)

(52) U.S. Cl. .................. 707/3; 707/1; 707/4

(58) Field of Classification Search .............. 707/1–4, 707/10, 100, 103 Y, 104.1
See application file for complete search history.

(56) References Cited

U.S. PATENT DOCUMENTS

| | | | | |
|---|---|---|---|---|
| 5,991,754 A | * | 11/1999 | Raitto et al. | 707/2 |
| 6,263,328 B1 | | 7/2001 | Coden et al. | |
| 6,314,430 B1 | | 11/2001 | Chang | |
| 2002/0069193 A1 | * | 6/2002 | Beavin et al. | 707/2 |

OTHER PUBLICATIONS

G. Mitchell, "Extensible Query Processing in an Object-Oriented Database," May 1993, Thesis, Department of Computer Science, Brown University, pp. 1-166.
IBM Patent Application filed on even date herewith by Carlson et al., "Runtime Query Optimization for Dynamically Selecting from Multiple Plans in a Query Based Upon Runtime-Evaluated Performance Criterion".
IBM Patent Application filed on even date herewith by Carlson et al., "Parallel Database Query Processing for Non-Uniform Data Sources via Buffered Access".
IBM Patent Application filed on even date herewith by Carlson et al., "Method for Efficient Processing of Multi-State Attributes".

* cited by examiner

*Primary Examiner*—Alford W. Kindred
(74) *Attorney, Agent, or Firm*—Martin & Associates, LLC; Derek P. Martin

(57) ABSTRACT

Previously-optimized database queries are stored in memory. When a new query needs to be optimized, the previously-optimized queries are examined to determine whether the new query has been previously optimized. If the new query has not been previously optimized, the previously-optimized queries are examined to determine whether any previously-optimized queries differ only in data type of one or more operands when compared to the new query. If a previously-optimized query that differs only in data type is located, the previously-optimized query is refreshed to reflect the different data type without the need of optimizing the new query from scratch. Portions of previously-optimized queries may thus be re-used even when a previously-optimized query is not identical to a new query to be optimized. As a result, the performance of query optimization in a database system is increased.

18 Claims, 5 Drawing Sheets

Select * from Table1 where C1=4 AND (C2>6 OR C3!=8)

APPARATUS AND METHOD FOR REFRESHING A DATABASE QUERY

PARENT APPLICATION

This patent application is a continuation-in-part of "OBJECT-ORIENTED QUERY EXECUTION DATA STRUCTURE", U.S. Ser. No. 10/165,293, filed on Jun. 7, 2002 now U.S. Pat. No. 6,915,291 by Carlson et al., which is incorporated herein by reference.

RELATED APPLICATIONS

This application is related to "PARALLEL DATABASE QUERY PROCESSING FOR NON-UNIFORM DATA SOURCES VIA BUFFERED ACCESS", U.S. Ser. No. 10/165,235, filed on Jun. 7, 2002 by Carlson et al., "RUNTIME QUERY OPTIMIZATION FOR DYNAMICALLY SELECTING FROM MULTIPLE PLANS IN A QUERY BASED UPON RUNTIME-EVALUATED PERFORMANCE CRITERION", U.S. Ser. No. 10/165,025, filed on Jun. 7, 2002 by Carlson et al., and "METHOD FOR EFFICIENT PROCESSING OF MULTI-STATE ATTRIBUTES", U.S. Ser. No. 10/164,767, filed on Jun. 7, 2002 by Carlson et al., which are all incorporated herein by reference.

BACKGROUND OF THE INVENTION

1. Technical Field

This invention generally relates to computer systems, and more specifically relates to apparatus and methods for accessing data in a computer database.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result.

The prior art has recognized that repeatedly optimizing the same query results in a degradation of database performance. As a result, the prior art includes query optimizers that save a query once it is optimized so it may be reused if the exact same query needs to be executed again. In the prior art, however, if the query is different at all, even slightly different, the query must be optimized again from scratch. For example, if a complex query is evaluated, and an operand in the query is a 16 bit integer, the same query that specifies an operand that is a 32 bit integer in the place of the operand that is a 16 bit integer is deemed to be a new query in the prior art, causing the query optimizer to completely optimize the new query, thereby not benefitting from any of the work previously performed in optimizing the query that specifies the 16 bit integer operand. Without a way for a query optimizer to benefit from optimizing that was previously performed on queries that specify operands of different data types, the computer industry will continue to suffer from excessive overhead in optimizing database queries.

DISCLOSURE OF INVENTION

According to the preferred embodiments, previously-optimized database queries are stored in memory. When a new query needs to be optimized, the previously-optimized queries are examined to determine whether the new query has been previously optimized. If the new query has not been previously optimized, the previously-optimized queries are examined to determine whether any previously-optimized queries differ only in data type of one or more operands when compared to the new query. If a previously-optimized query that differs only in data type is located, the previously-optimized query is refreshed to reflect the different data type without the need of optimizing the new query from scratch. Portions of previously-optimized queries may thus be re-used even when a previously-optimized query is not identical to a new query to be optimized. As a result, the performance of query optimization in a database system is increased.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to optimizing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figures 2, 3:
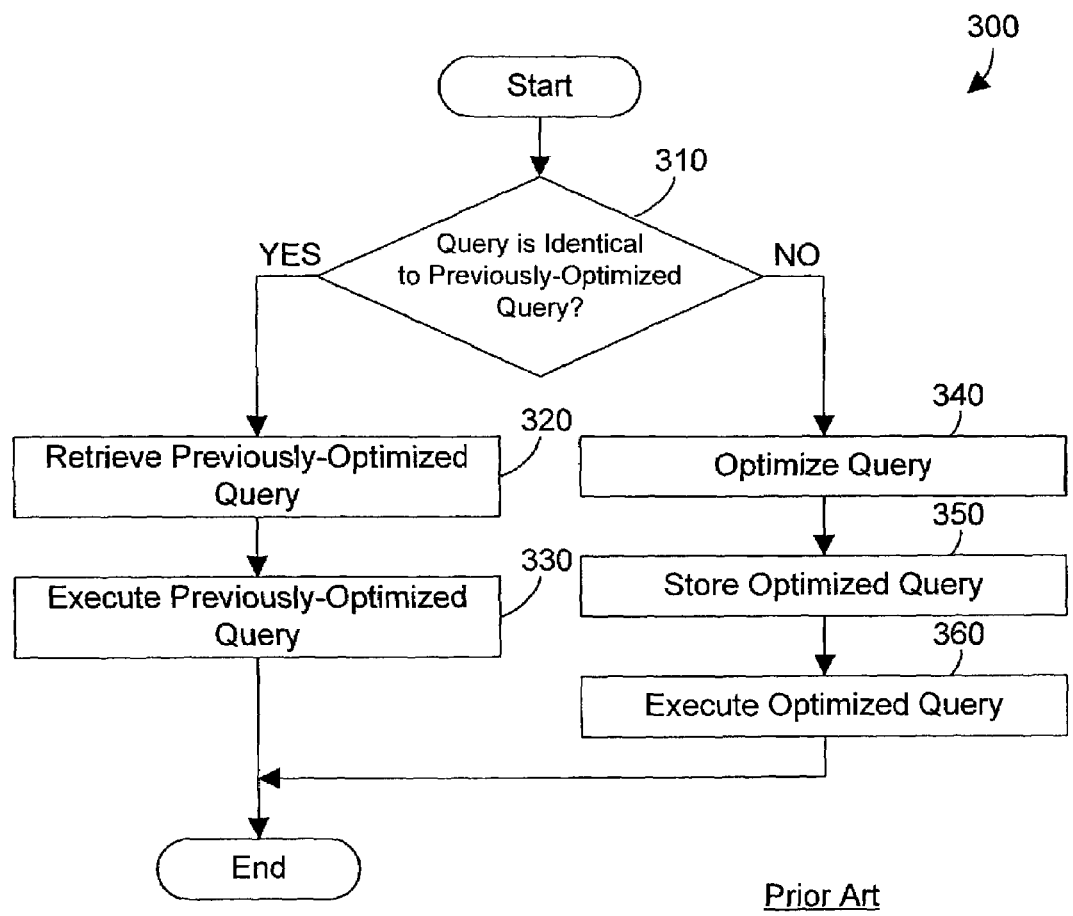
FIG. 2 is a sample database query in Structured Query Language (SQL)
FIG. 3 is a flow diagram of a prior art method for optimizing a database query.

One popular way to define a query uses Structured Query Language (SQL). SQL defines a syntax for generating and processing queries that is independent of the actual structure and format of the database. One sample SQL query is shown in FIG. 2. The "select *" statement tells the database query processor to select all columns, the "from Table" statement identifies which database table to search, and the "where" clause specifies one or more expressions that must be satisfied for a record to be retrieved. Note that the query of FIG. 2 is expressed in terms of columns C1, C2 and C3. Information about the internal storage of the data is not required as long as the query is written in terms of expressions that relate to values in columns from tables. For the query of FIG. 2, the "where" clause specifies that the first column has a value equal to four (C1=4) logically anded with the expression that the second column is greater than six OR the third column is not equal to eight.

In the prior art, a tool known as a query optimizer evaluates expressions in a query. The evaluation of expressions in a query can take considerable time. For this reason, known query optimizers often store optimized queries so they can be reused in the future without the need of re-processing their expressions. An example of a prior art method for optimizing a query is method 300 shown in FIG. 3. Method 300 begins when the query optimizer needs to optimize a query. The query is compared to the previously-optimized queries that have been stored (step 310). If the query is identical to a previously-optimized query (step 310=YES), the previously-optimized query is retrieved (step 320) and executed (step 330). If the query is not identical to a previously-optimized query (step 310=NO), the query is optimized (step 340), the optimized query is stored (step 350), and the query is executed (step 360). In the prior art, if a query is identical to a previously-optimized query, there is no need to re-process all of the expressions in the query, because these expressions have been previously optimized and stored for future use. In this manner, if the same query is executed multiple times, the prior art avoids the overhead associated with optimizing the query each time the query is executed.

One deficiency in the prior art is that the query must be identical in step 310 in order to benefit from a previously-optimized query. The preferred embodiments recognize that some queries may be refreshed, which updates a query for a new data type without re-optimizing the entire query. Examples in accordance with the preferred embodiments are described in detail below.

2.0 Detailed Description

The preferred embodiments provide a way to refresh a previously-optimized query when the only change to the query is a change in data type of one or more operands in the query. Refreshing the query for a change in data type may be performed by a simple refresh operation, without re-optimizing all of the expressions in the query.

Figure 1:
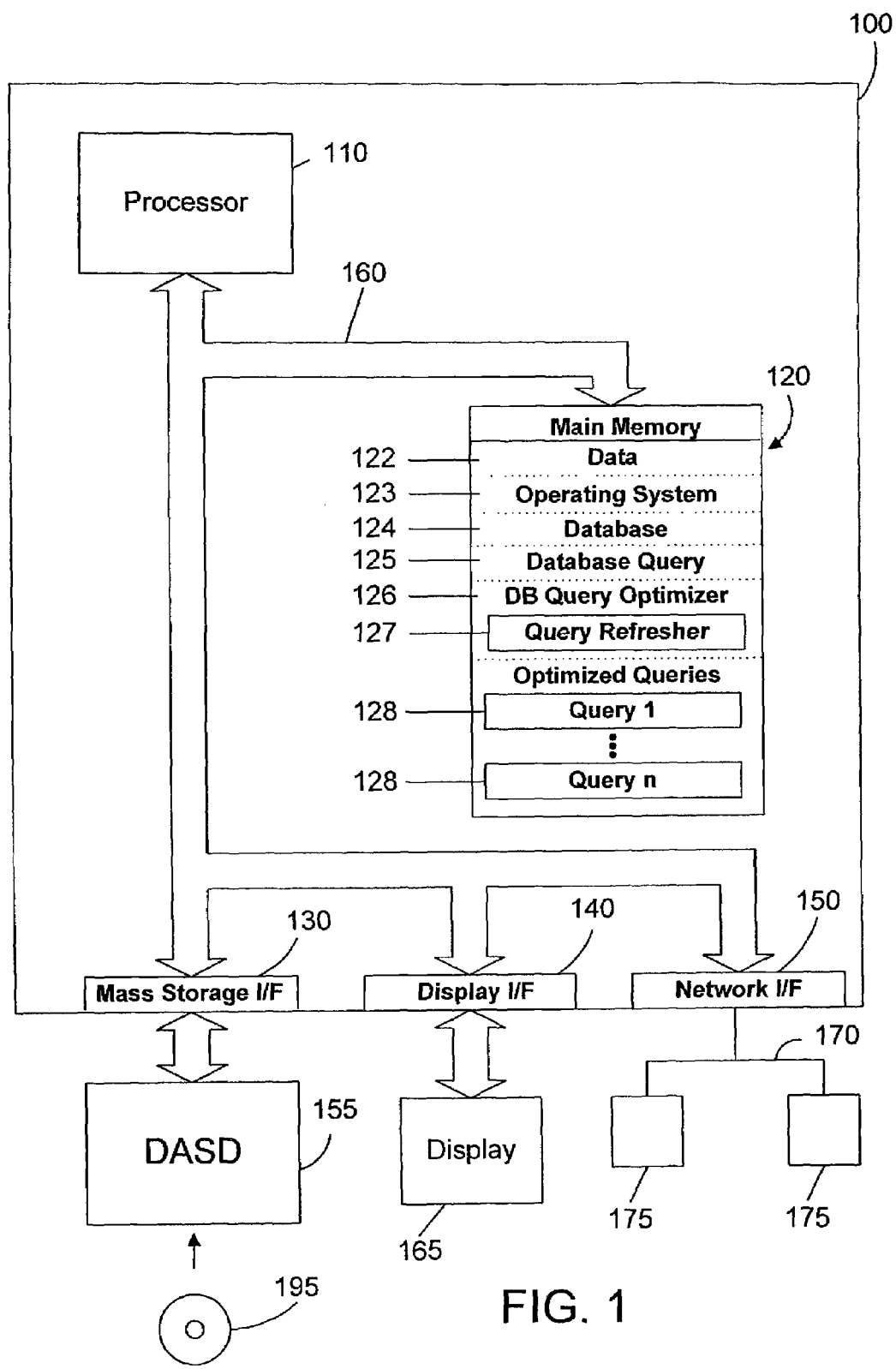
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM iseries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD ROM drive, which may store data to and read data from a CD ROM 195.

Main memory 120 in accordance with the preferred embodiments contains data 122, an operating system 123, a database 124, one or more database queries 125, a database query optimizer 126, and one or more optimized queries 128. Database query optimizer 126 preferably includes a query refresher 127 that allows for refreshing an optimized query 128 when the optimized query differs from a query 125 that needs to be optimized only in the data type of one or more operands in the query.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, database 124, database query 125, database query optimizer 126, and optimized queries 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Database 124 is any suitable database, whether currently known or developed in the future. Database query 125 is a query in a format compatible with the database 124 that allows information stored in the database 124 that satisfies the database query 125 to be retrieved. Database query optimizer 126 optimizes a database query 125. Once database query optimizer 126 optimizes a query, optimized query 128 is stored in main memory 120. This allows the stored optimized queries to be used later if a similar query is encountered that differs only in data type of one or more of the operands of the query. Query refresher 127 is used to refresh an optimized query 128 to reference one or more different operands of different data types. An optimized query 128 may be refreshed much more quickly than re-optimizing the query due to a difference in data type (as the prior art would do).

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 195 of FIG. 1), and transmission type media such as digital and analog communications links.

Figure 4:
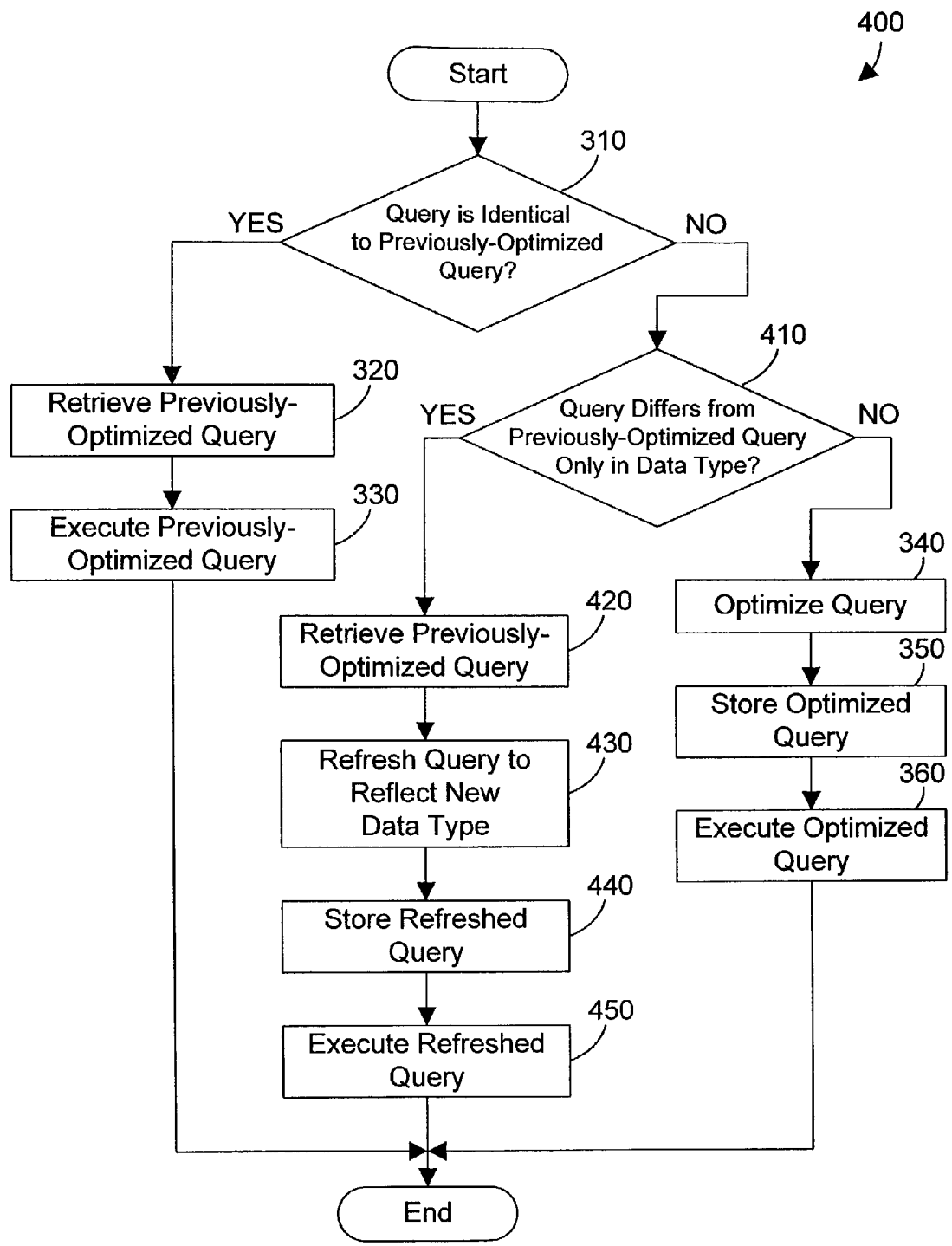
FIG. 4 is a flow diagram of a method for optimizing a database query in accordance with the preferred embodiments.

Referring to FIG. 4, a method 400 in accordance with the preferred embodiments begins when a query needs to be optimized. If the query to be optimized is identical to a previously-optimized query (step 310=YES), the previously-optimized query is retrieved (step 320) and executed (step 330). If the query to be optimized is not identical to a previously-optimized query (step 310=NO), method 400 then checks to see if the query to be optimized differs from a previously-optimized query only in data type of one or more of the query operands (step 410). If not (step 410=NO), the query is optimized (step 340), stored (step 350), and executed (step 360). If the query to be optimized differs from a previously-optimized query only in data type (step 410=YES), the previously-optimized query is retrieved (step 420), the retrieved query is refreshed to reflect the new data type of one or more of the query operands (step 430), the refreshed query is stored (step 440), and the refreshed query is executed (step 450). Note that steps 310, 320, 330, 340, 350, and 360 are preferably the same as the corresponding steps in FIG. 3 that shows prior art method 300. However, these steps may also include additional or different function when compared to the prior art steps in FIG. 3. Note also that when the refreshed query is stored in step 440, the refreshed query preferably is added to the previously-optimized queries. In the alternative, the refreshed query could replace the previously-optimized query if it is desirable to minimize the number of stored previously-optimized queries.

The parent of this application discloses an object oriented data structure for representing and executing queries. A query is comprised of a collection of live objects arranged in a tree relationship, along with an attribute data structure that is configured to manipulate one or more attributes in the attribute data structure. The attribute data structure includes an attribute operation list that contains logic that operates on one or more operands specified in a corresponding attribute descriptor array. The logic may include calls to methods that process data of a specified data type.

Figure 5:
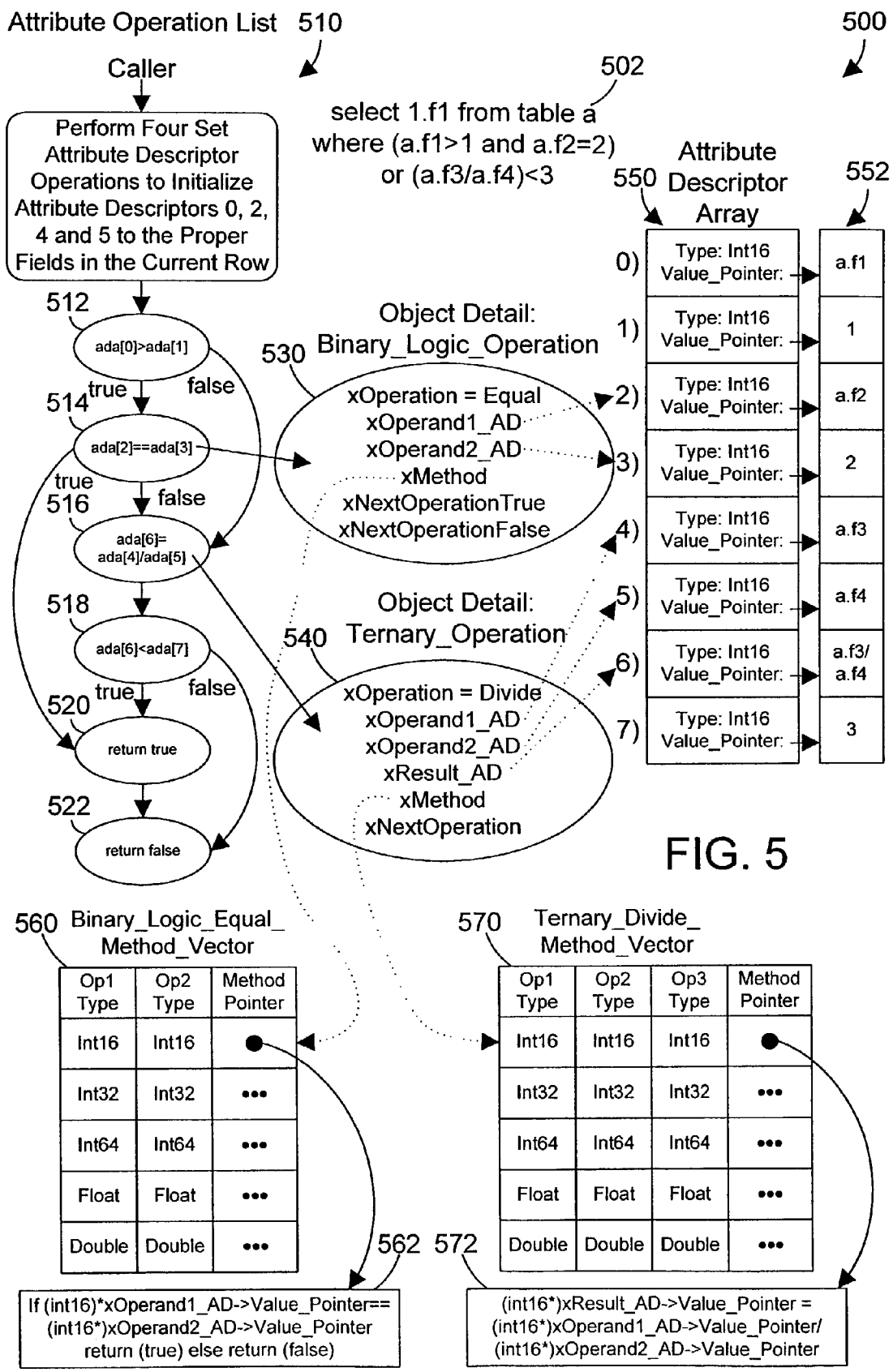
FIG. 5 is a block diagram showing an object oriented data structure that represents a database query.

An example of a query object in accordance with the object oriented data structure disclosed in the parent application is shown in FIG. 5. A query 502 is represented by the data structure 500. Query 502 states: select 1.f1 from table a where (1.f1>1 and a.f2=2) or (a.f3/a.f4)<3. Data structure 500 includes an attribute operation list 510 that includes logic for executing the query. Attribute operation list 510 includes attribute operation objects 512, 514, 516, 518, 520 and 522 that implement the query logic. The detail for attribute operation object 514 is shown in 530, while the detail for attribute operation object 516 is shown in 540.

Attribute operation object 530 shows operations that are performed to implement the equality test shown in object 514. Two operands are shown, which reference entries in the attribute descriptor array 550. Attribute descriptor array 550 includes information that describes the operand, including its data type, and a Value_Pointer that points to a location 552 in the database where the operand value resides. Thus, we see from attribute descriptor array 550 that entry 0) is a 16 bit integer, with a value pointer that points to the value of a.f1 in the database. Entry 1) is a 16 bit integer, with a value pointer that points to a constant with a value of 1. Entry 2) is a 16 bit integer, with a value pointer that points to the value of a.f2 in the database. Entry 3) is a 16 bit integer, with a value pointer that points to a constant with a value of 2. Entry 4) is a 16 bit integer, with a value pointer that points to the value of a.f3 in the database. Entry 5) is a 16 bit integer, with a value pointer that points to the value of a.f4 in the database. Entry 6) is a 16 bit integer, with a value pointer that points to the value of a.f3 divided by a.f4. Entry 7 is a 16 bit integer, with a value that points to a constant with a value of 3.

The two operands in attribute operation object 530 correspond to entries 2) and 3), respectively, in the attribute descriptor array 550, as shown by the dotted arrows pointing to entries 2) and 3). The three operands in attribute operation object 540 correspond to entries 4)–6), respectively, in the attribute descriptor array 550, as shown by the dotted arrows pointing to entries 4)–6).

Each attribute operation object 530 and 540 includes a call to a method that performs the desired operation on the specified operands. The method to be executed is determined during a refresh operation by examining a method vector that corresponds to the method being called. For example, object 530 includes an operation xMethod. A refresh operation determines from the Binary_Logic_Equal_Method_Vector 560 which method corresponds to the data type of the operands, and writes the pointer to the method to the xMethod in object 530. Thus, when xMethod is executed, the corresponding method code 562 is executed that corresponds to xMethod. Note from the entries in method vector 560 that a different method is invoked for each data type of the two operands. While method vectors 560 and 570 show methods that operate on operands of the same data type, it is also within the scope of the preferred embodiments to operate on operands of different data types by the same method. As shown in FIG. 5, the method pointer for 16 bit integer operations points to method code 562, which returns true if the 16 bit integer value of operand 1 is equal to the sixteen bit integer value of operand 2, and returns false otherwise. Thus, during a refresh operation, the pointer to method code 562 is written to xMethod in object 530.

In similar fashion, the method xMethod in object 540 determines from Ternary_Divide_Method_Vector 570 which method pointer corresponds to the type of the operands, and invokes the method code 572 that is identified by the method pointer for 16 bit operands. Method code 572 performs a division of two 16 bit integer operands, and returns the result in a third 16 bit integer operand.

Object oriented data structure 500 of FIG. 5 represents one possible representation for a query in accordance with the data structure disclosed in the parent application. Because this data structure separates operations specified in the attribute operation list from their operands in the attribute descriptor array, it is now possible in the preferred embodiments to "refresh" a previously-optimized query that is different only in data type from a query to be optimized. Refreshing a database query is the process of making only minor changes to the query that allow most of the previous optimizing of the query to be reused without the need of re-optimizing the query from scratch. Recall that the prior art re-optimizes any query that is not identical to a previously-optimized query. The present invention recognizes that queries that have the object oriented data structure disclosed in the parent application and represented in FIG. 5 may be refreshed to process an operand of a new data type instead of re-optimizing the entire query.

Figure 6:
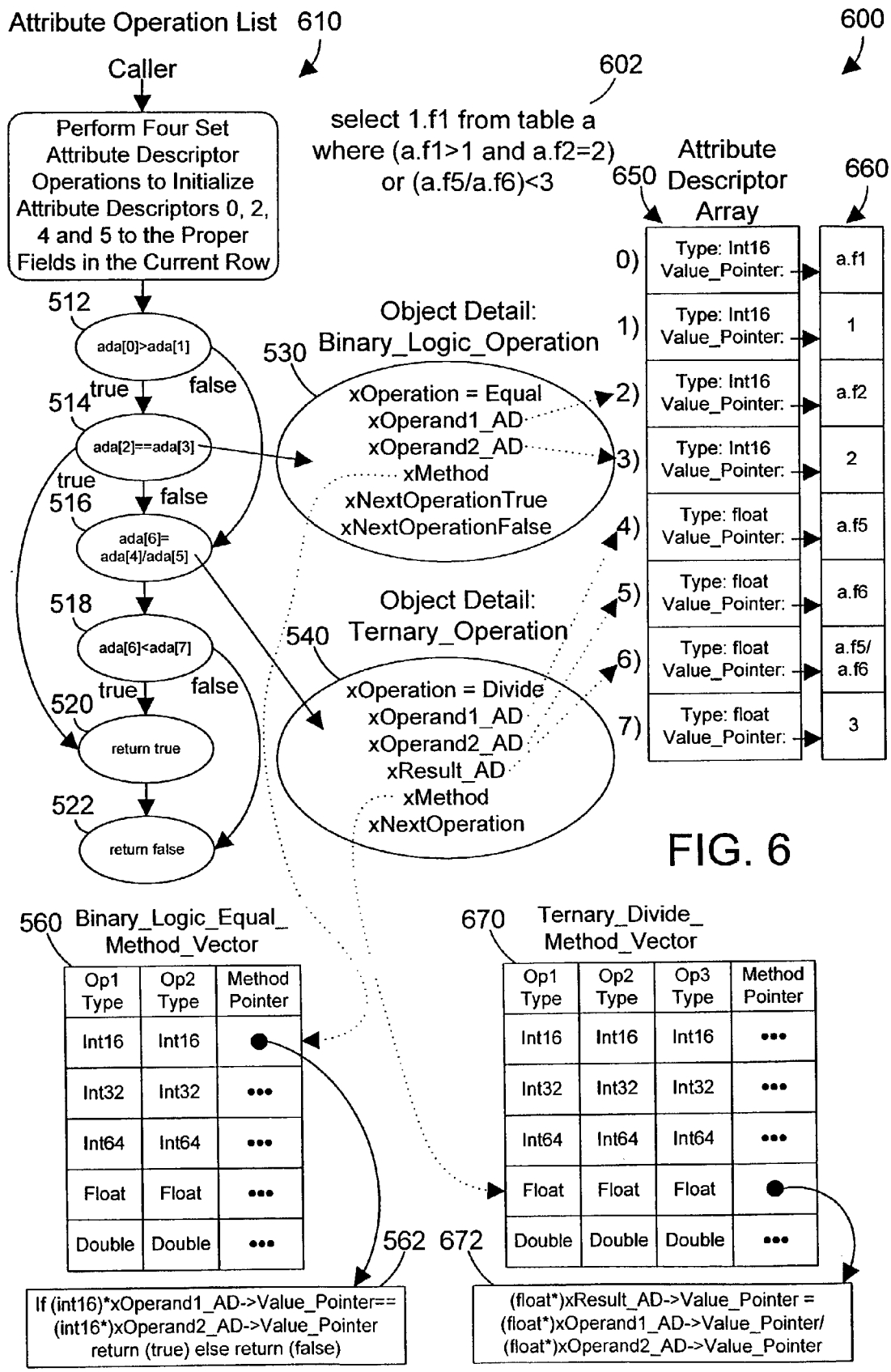
FIG. 6 is a block diagram showing the object oriented data structure of FIG. 5 after refreshing the query.

Referring now to FIG. 6, object oriented data structure 600 includes an attribute operation list 610 that is an object in the preferred embodiments that preferably includes a refresh() method that may be invoked when a query needs to be optimized that is identical to a previously-optimized query with the exception of having one or more operands that are of a different data type than the operands in the previously-optimized query. Query 602 in FIG. 2 is: select 1.f1 from table a where (a.f1>1 and a.f2=2) or (a.f5/a.56)<3.

We note that the only difference between the query 502 in FIG. 5 and query 602 in FIG. 6 is that the term a.f3/a.f4 in query 502 has been replaced by a.f5/a.f6 in query 602. We assume for this example that a.f5 and a.f6 contain data that is of type float, meaning a single precision (32 bit) floating point number. Note that a.f3 and a.f4 were 16 bit integers in query 502, as shown by entries 4) and 5) in the attribute descriptor array 550. Thus we see that query 602 differs from query 502 only by the data type of one or more of its operands.

The preferred embodiments recognize that a change of data type of one or more operands may be efficiently optimized by refreshing a previously-optimized query (if one exists) to represent the new operand(s). Refreshing a previously-optimized query involves the steps of updating the attribute descriptor array to reference the new operand(s), and changing one or more method pointers to point to method code that processes the data type of the new operand(s). The first step in refreshing the data structure is to change the type of entries 4) through 7) to float. Thus, attribute descriptor array 650 in FIG. 6 shows that entries 4) through 7) are of type float, and reference values of the changed operands. Entries 4) and 5) reference the values in a.f5 and a.f6, respectively. Entry 6) references the result of dividing the value in a.f5 with the value in a.f6. The data type of entry 7) is also changed to show that the constant 3 is a floating point number, so it can be compared to the result of the a.f5/a.f6 computation, which is a floating point number.

Once the attribute descriptor array has been updated, the method pointer for the operations on the operands of the changed data type must be updated to reflect the data type of the changed operands. Thus, we see in FIG. 6 that method vector 670 includes a method pointer that points to method code 672 for floating point operands. Method code 672 performs a floating point divide of the first operand by the second operand, and stores the result in the third operand.

In the preferred embodiments, the refresh( ) method on the attribute operation list 610 may include the modification of the attribute descriptor array 650. In this manner, invoking the refresh( ) method would result in performing both the update of the attribute descriptor array 650 and the update of the method pointer in method vector 670. Note, however, that it is equally within the scope of the preferred embodiments to modify the attribute descriptor array 650 to reflect the new operands and/or data types before invoking the refresh( ) method, which would then only update the method pointer in the method vector 670.

The process of refreshing a database query takes substantially less time than the process of building a new query data structure. If prior art methods for optimizing queries were applied to the object oriented data structure for representing queries taught in the parent application, a query that is different only in the data type of one or more of its operands than a previously-optimized query would require full optimization of the query, meaning that a new data structure for the query would have to be generated. For the case shown in FIG. 6, this would involve generating the attribute operation list 610, generating a new attribute descriptor array 650, and generating method vectors 660 and 670. The preferred embodiments avoid the generation of the attribute operation list 610 and method vectors 660 and 670, and merely update an existing attribute descriptor array instead of generating a new one. For these reason, refreshing a database query for reuse with operands of different data types can provide a significant performance increase in optimizing database queries.

Note that a change in data type described herein is used in a broad sense to mean any change in type that may be recognized in any computer system. Thus, a change in data type not only includes a change from an integer to a floating point number, but also includes a change from different lengths of the same kind, such as a change from a 16 bit integer to a 32 bit integer.

The preferred embodiments described herein allow using a previously-optimized query when the previously-optimized query varies from a current query only in the data type of one or more operands in the query. If a query to be executed varies only in data type from a previously-optimized query, the previously-optimized query may be refreshed to represent the query to be executed. This eliminates the overhead associated with optimizing the query if the query is not identical to a previously-optimized query. Note that a change of data type may include a change in the data type of output attributes of the query.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor; and
   a query refresher residing in the memory and executed by the at least one processor, the query refresher determining whether a query to be optimized differs only in data type from a stored optimized query, and if so, the query refresher retrieves the stored optimized query and refreshes the stored optimized query to reflect a change in data type; wherein the refreshing of the stored optimized query comprises changing at least one operand specified in the stored optimized query to an operand of a different data type, and changing at least one method pointer to point to code that processes the operand of the different data type.

2. The apparatus of claim 1 wherein the query to be optimized comprises a query to a database.

3. The apparatus of claim 1 wherein the query refresher stores the refreshed query as a stored optimized query.

4. An apparatus comprising:
   at least one processor;
   a memory coupled to the at least one processor;
   a database residing in the memory;
   a plurality of optimized queries residing in the memory;
   a query refresher that determines whether a query to be optimized differs only in data type from a selected one of the plurality of optimized queries, and if so, the query refresher retrieves the selected one optimized query and refreshes the selected one optimized query by changing at least one operand specified in the selected one optimized query to an operand of a different data type, and changing at least one method pointer to point to code that processes the operand of the different data type.

5. The apparatus of claim 4 wherein the query refresher stores the refreshed query in the memory as one of the plurality of optimized queries.

6. An apparatus comprising:
   at least one processor;
   a memory coupled to the at least one processor;
   a database residing in the memory;
   a plurality of optimized queries residing in the memory, each optimized query comprising a collection of object oriented objects that include an attribute operation list that specifies at least one operation to perform on at least one operand identified by an attribute descriptor array, the attribute operation list including a call to at least one method vector that identifies a method pointer corresponding to a selected data type, wherein the method pointer points to code that processes operands of the selected data type;
   a query refresher that determines whether a query to be optimized differs only in data type of at least one operand from a selected one of the plurality of optimized queries, and if so, the query refresher updates the attribute descriptor array to reference at least one operand of a different data type and changes at least one method pointer to point to code that processes the operand of the different data type.

7. The apparatus of claim 6 wherein the query refresher further changes the attribute descriptor array of the previously-optimized query to represent the change in data type for the at least one operand.

8. A method for optimizing a database query, the method comprising the steps of:
   (A) determining whether the database query is identical to a previously-optimized query;
   (B1) if the database query is identical to a previously-optimized query, retrieving the previously-optimized query;
   (B2) if the database query is not identical to a previously-optimized query, determining whether the database query differs only in data type from a previously-optimized query;
      (B2A) if the database query differs only in data type from the previously- optimized query, performing the steps of:
         (C1) retrieving the previously-optimized query;
         (C2) refreshing the previously-optimized query to reflect a change in data type to at least one operand in the previously-optimized query; and
         (C3) storing the refreshed query.

9. The method of claim 8 further comprising the step of:
   (C4) executing the refreshed query.

10. The method of claim 8 wherein the database query differs only in data type from the previously-optimized query if the database query references an operand that has a different data type than the corresponding operand in the previously-optimized query.

11. The method of claim 8 further comprising the step of:
   (B2B) if the database query differs more than only in data type from the previously-optimized query, performing the steps of:
      (B2B1) optimizing the database query; and
      (B2B2) storing the optimized database query.

12. A method for executing a database query, the method comprising the steps of:
   (A) determining whether the database query is identical to a previously-optimized query;
   (B1) if the database query is identical to a previously-optimized query, retrieving the previously-optimized query and executing the previously-optimized query;
   (B2) if the database query is not identical to a previously-optimized query, determining whether the database query differs only in data type from the previously-optimized query;

(B2A) if the database query differs only in data type from the previously- optimized query, performing the steps of:
  (B2A1) retrieving the previously-optimized query;
  (B2A2) refreshing the previously-optimized query to reflect a change in data type to at least one operand in the previously-optimized query;
  (B2A3) storing the refreshed query; and
  (B2A4) executing the refreshed query;
(B2B) if the database query differs more than only in data type from the previously-optimized query, performing the steps of:
  (B2B1) optimizing the database query;
  (B2B2) storing the optimized database query; and
  (B2B3) executing the optimized database query.

13. The method of claim 12 wherein step (B2A2) comprises the steps of:
updating an attribute descriptor array to point to at least one new operand that has a data type that is different from the corresponding operand in the previously-optimized query; and
updating a method pointer to point to code that processes operands of the different data type.

14. A computer readable program product comprising:
(A) a query refresher that determines whether a query to be optimized differs only in data type from a stored optimized query, and if so, the query refresher retrieves the stored optimized query and refreshes the stored optimized query to reflect a change in data type, wherein the refreshing of the stored optimized query comprises changing at least one operand specified in the stored optimized query to an operand of a different data type, and changing at least one method pointer to point to code that processes the operand of the different data type; and
(B) recordable media bearing the query refresher.

15. The program product of claim 14 wherein the query to be optimized comprises a query to a database.

16. The program product of claim 14 wherein the query refresher stores the refreshed query as a stored optimized query.

17. A computer readable program product comprising:
(A) a query refresher that determines whether a query to be optimized differs only in data type from a selected one of a plurality of optimized queries, and if so, the query refresher retrieves the selected one optimized query and refreshes the selected one optimized query by changing at least one operand specified in the selected one optimized query to an operand of a different data type, and changing at least one method pointer to point to code that processes the operand of the different data type; and
(B) recordable media bearing the query refresher.

18. A computer readable program product comprising:
(A) a query refresher that determines whether a query to be optimized differs only in data type of at least one operand from a selected one of the plurality of optimized queries, each optimized query comprising a collection of object oriented objects that include an attribute operation list that specifies at least one operation to perform on at least one operand identified by an attribute descriptor array, the attribute operation list including a call to at least one method vector that identifies a method pointer corresponding to a selected data type, wherein the method pointer points to code that processes operands of the selected data type, and if the query to be optimized differs only in data type of at least one operand from the selected one optimized query, the query refresher updates the attribute descriptor array to reference at least one operand of a different data type and changes at least one method pointer to point to code that processes the operand of the different data type; and
(B) recordable media bearing the query refresher.

* * * * *